Jan. 7, 1941.   J. B. ARMITAGE ET AL   2,227,620
MILLING MACHINE
Filed Dec. 14, 1936   10 Sheets-Sheet 4
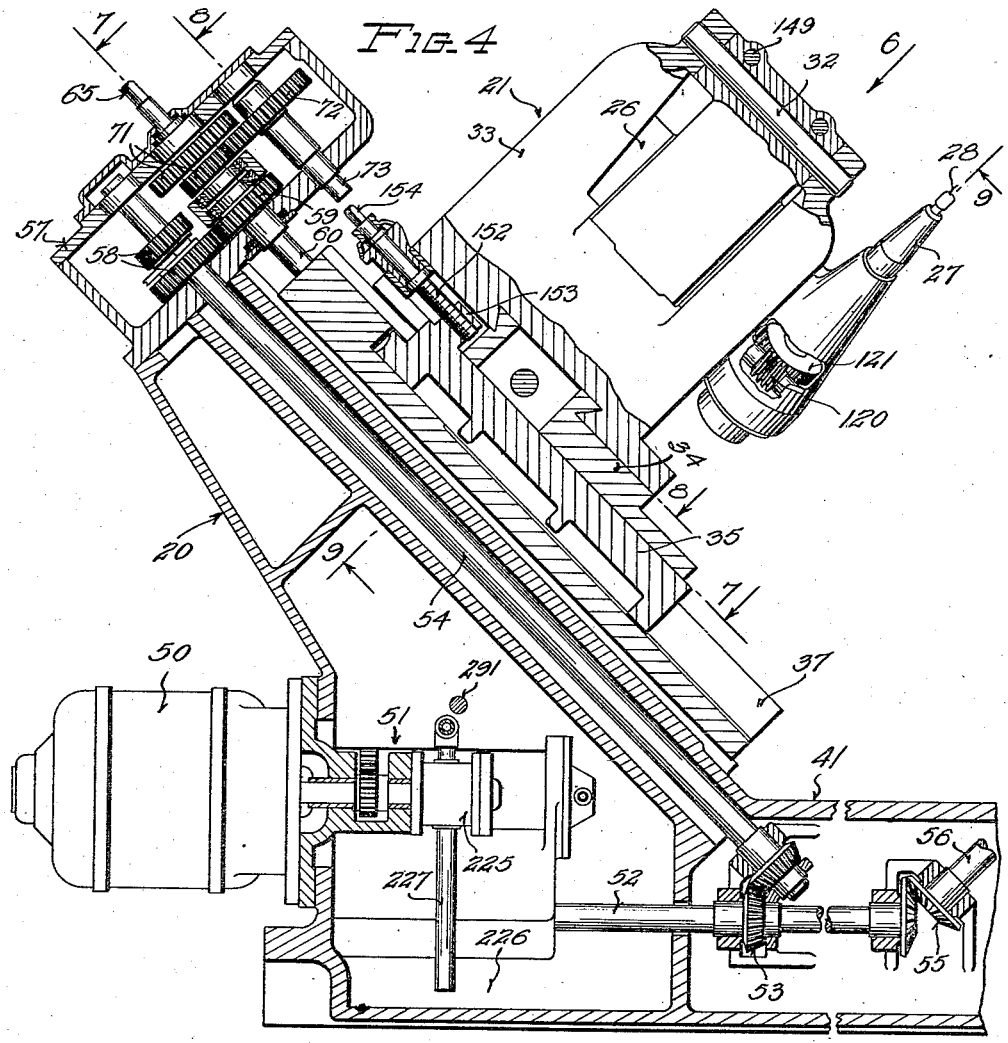
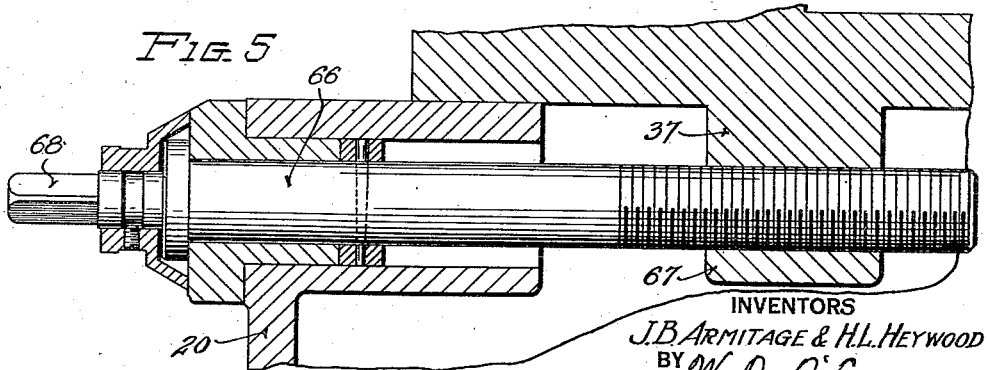
INVENTORS
J.B. ARMITAGE & H.L. HEYWOOD
BY W. D. O'Connor
ATTORNEY

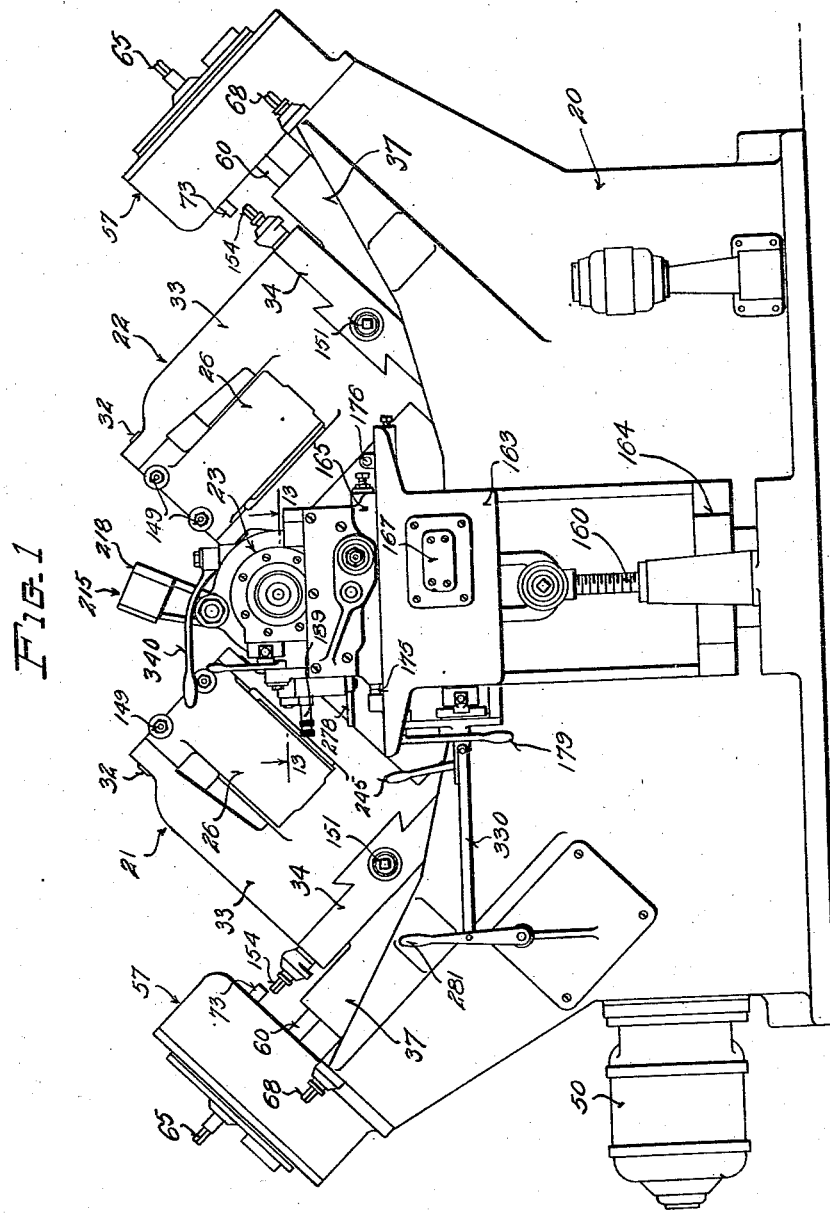

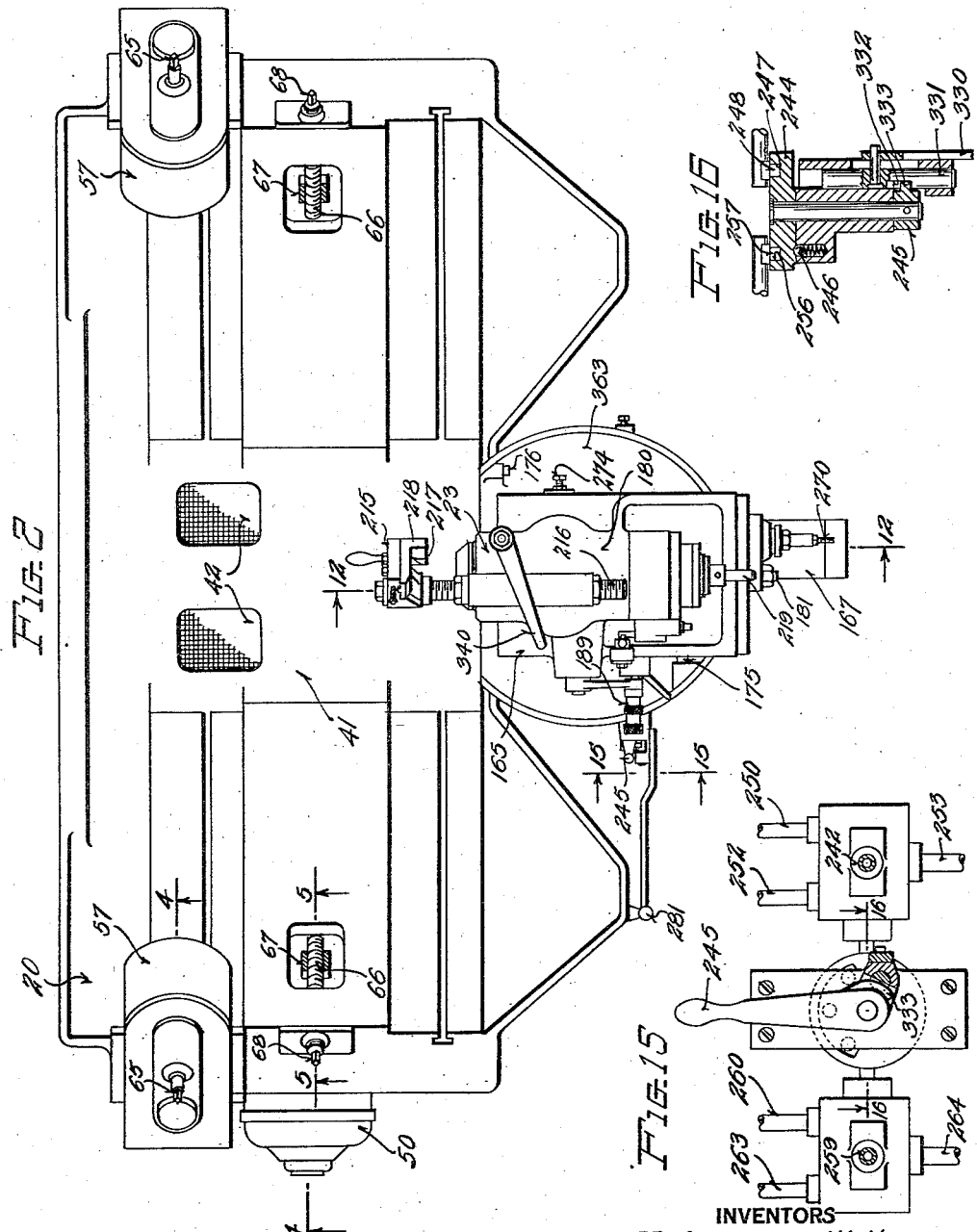

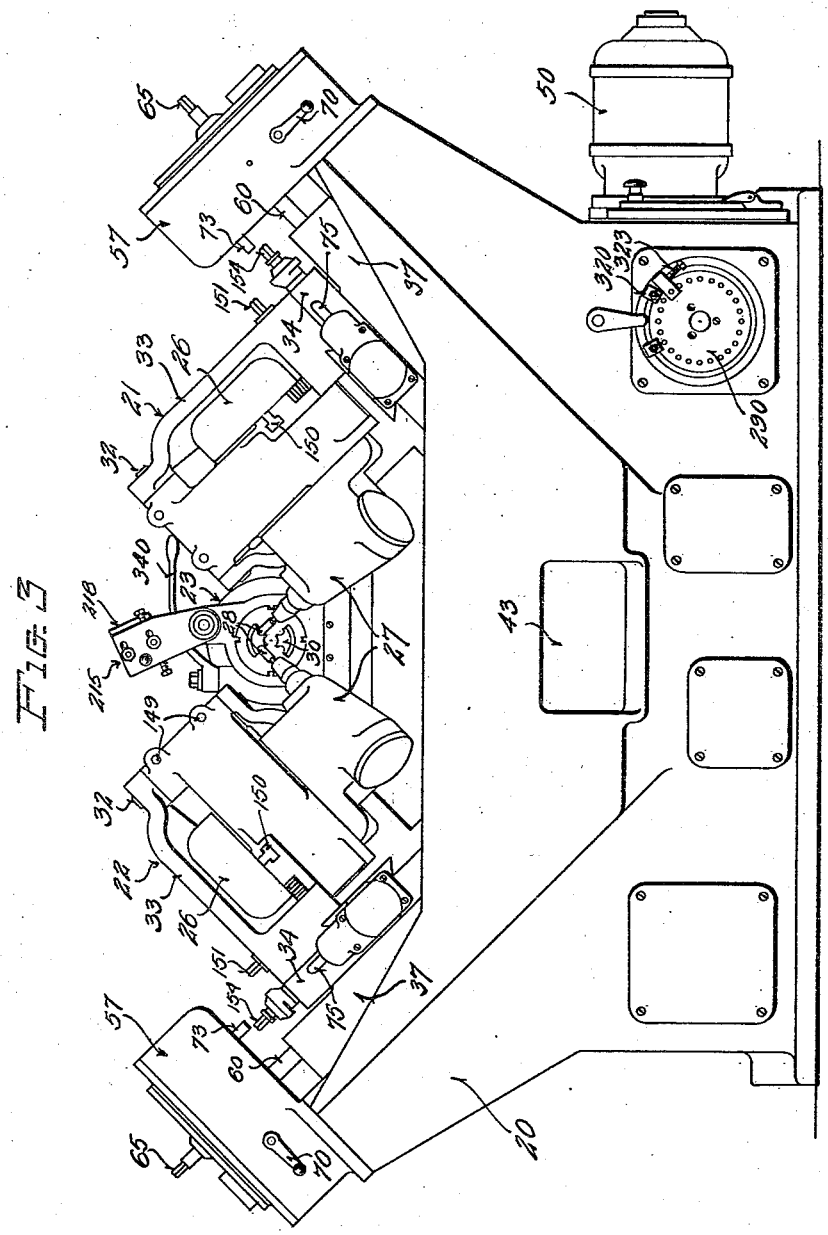

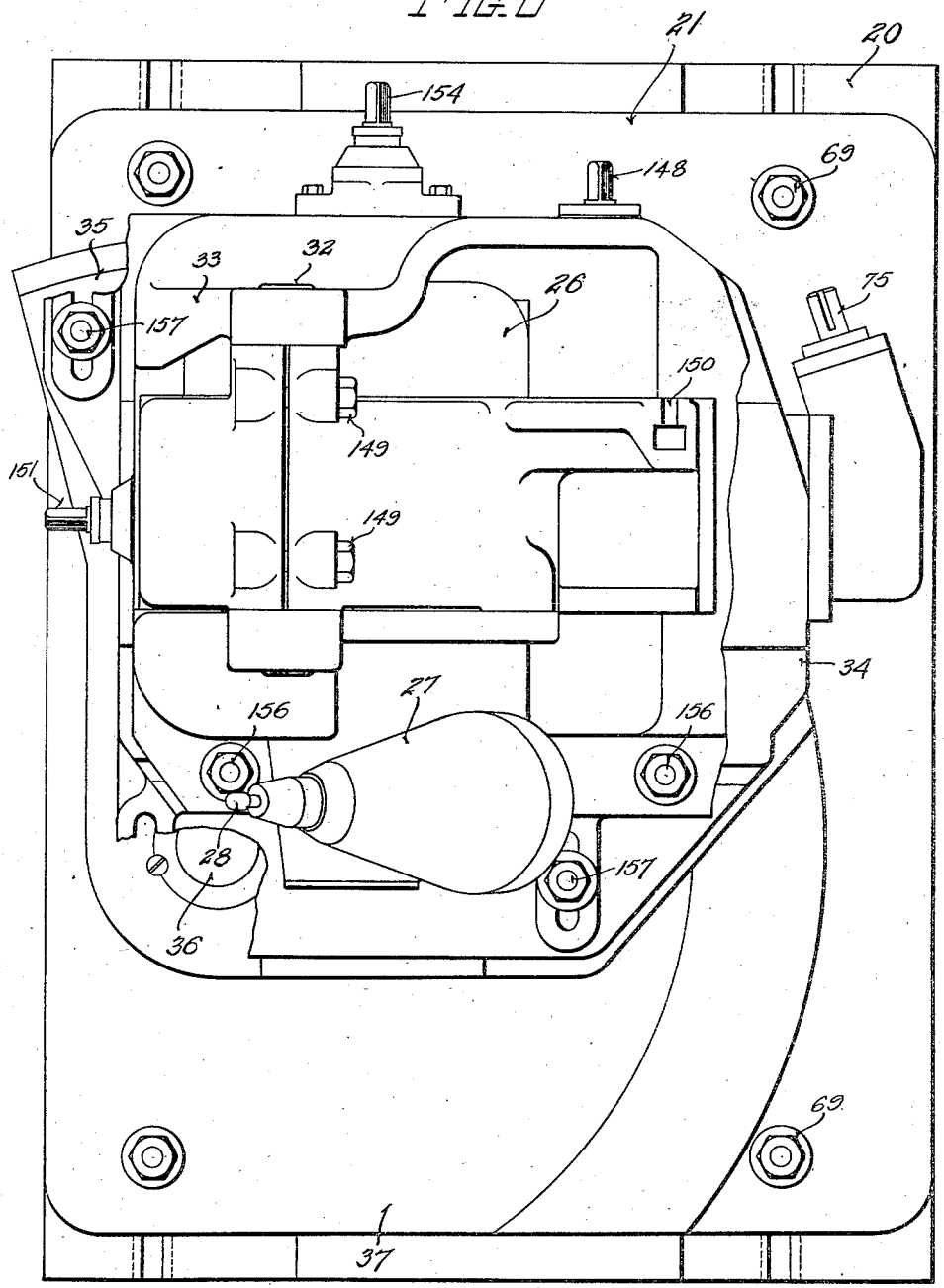

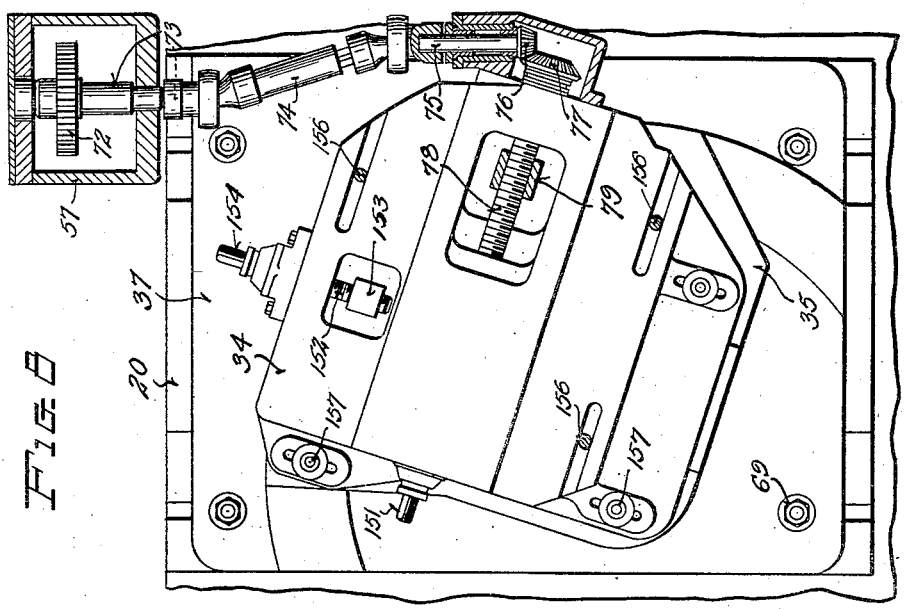
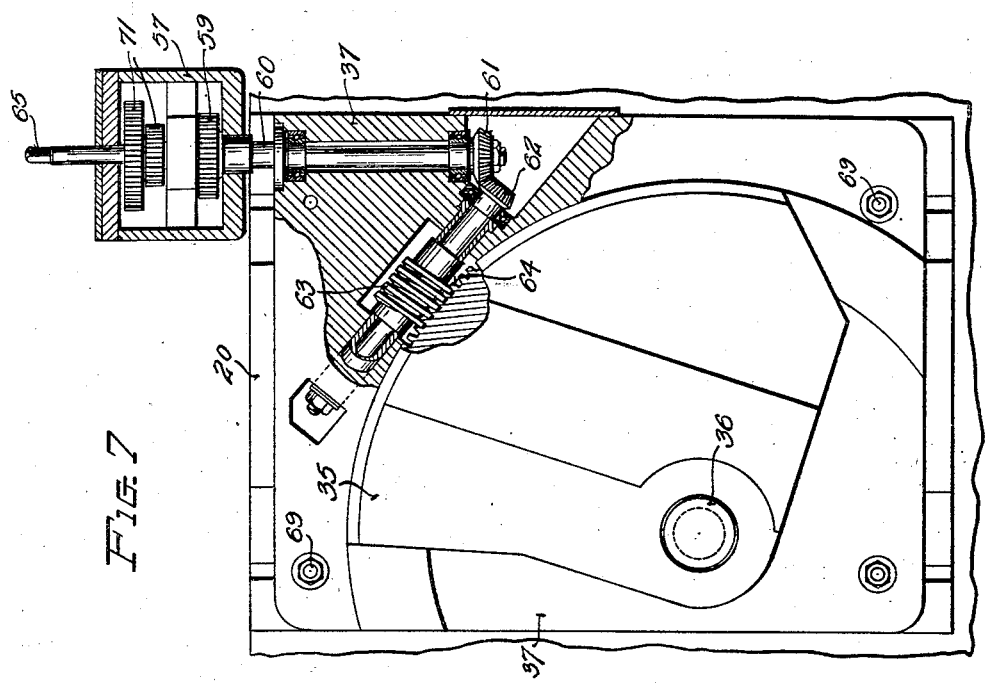

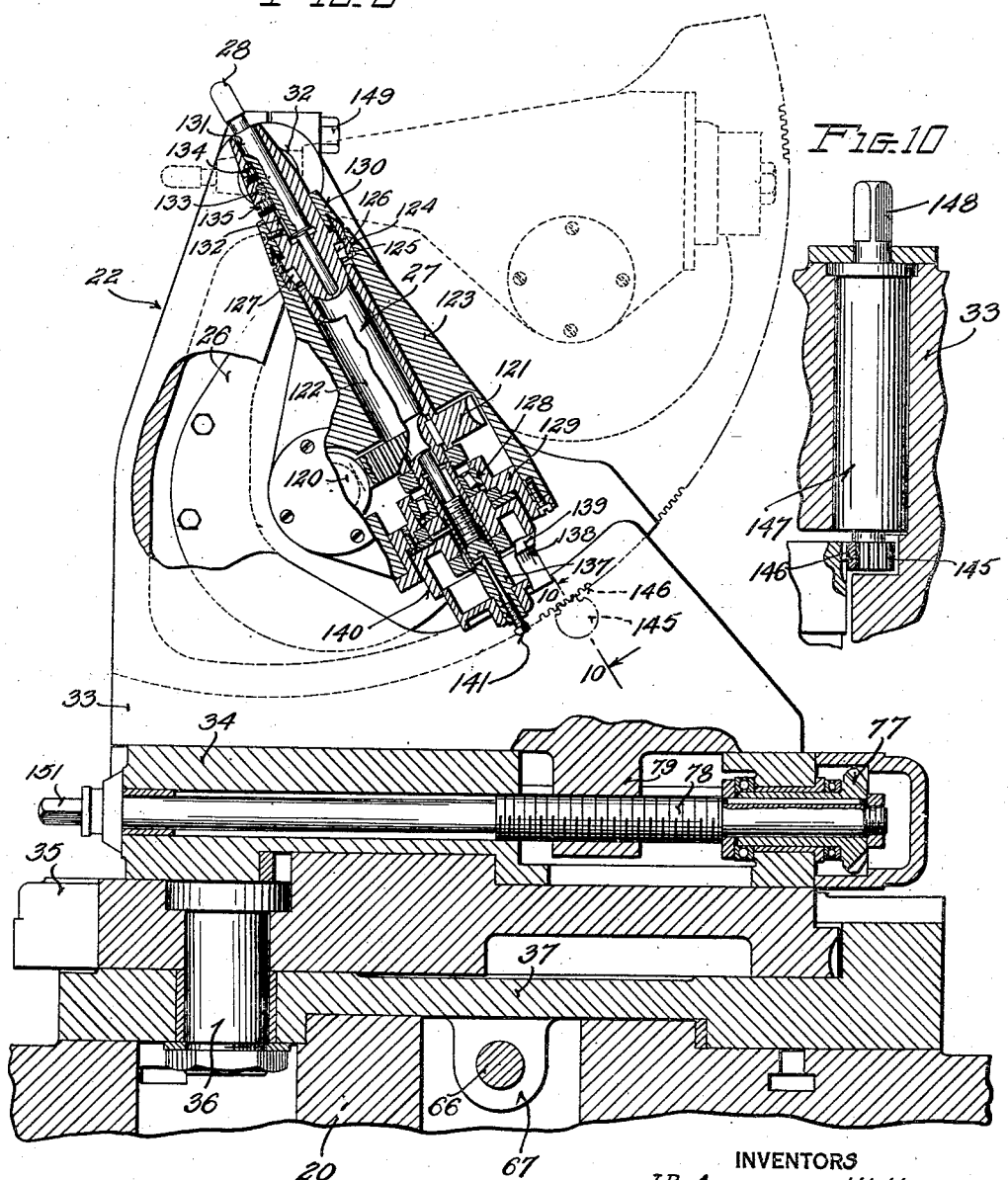

Jan. 7, 1941.  J. B. ARMITAGE ET AL  2,227,620
MILLING MACHINE
Filed Dec. 14, 1936  10 Sheets-Sheet 8

INVENTORS
J.B. ARMITAGE & H.L. HEYWOOD
BY W. D. O'Connor
ATTORNEY

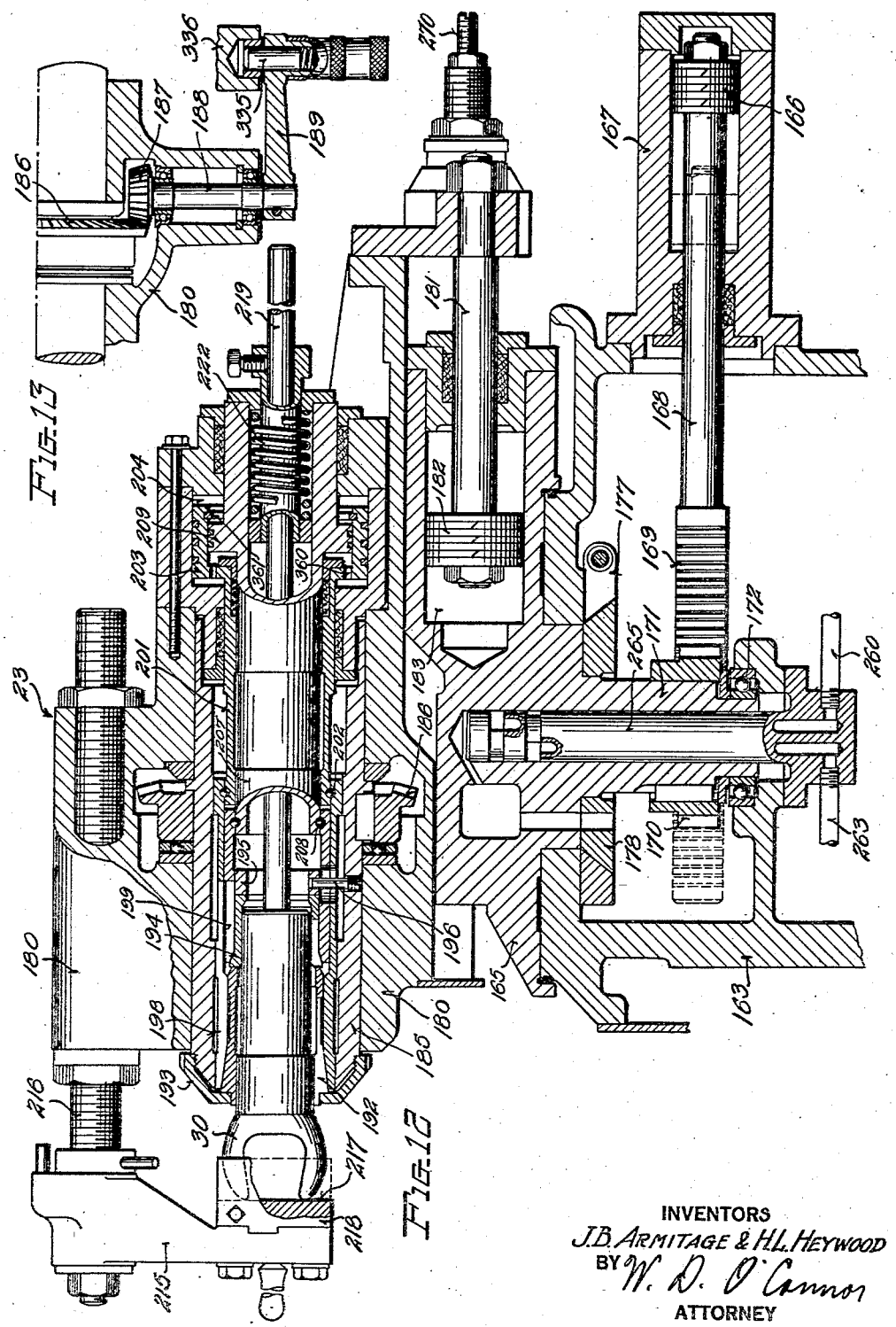

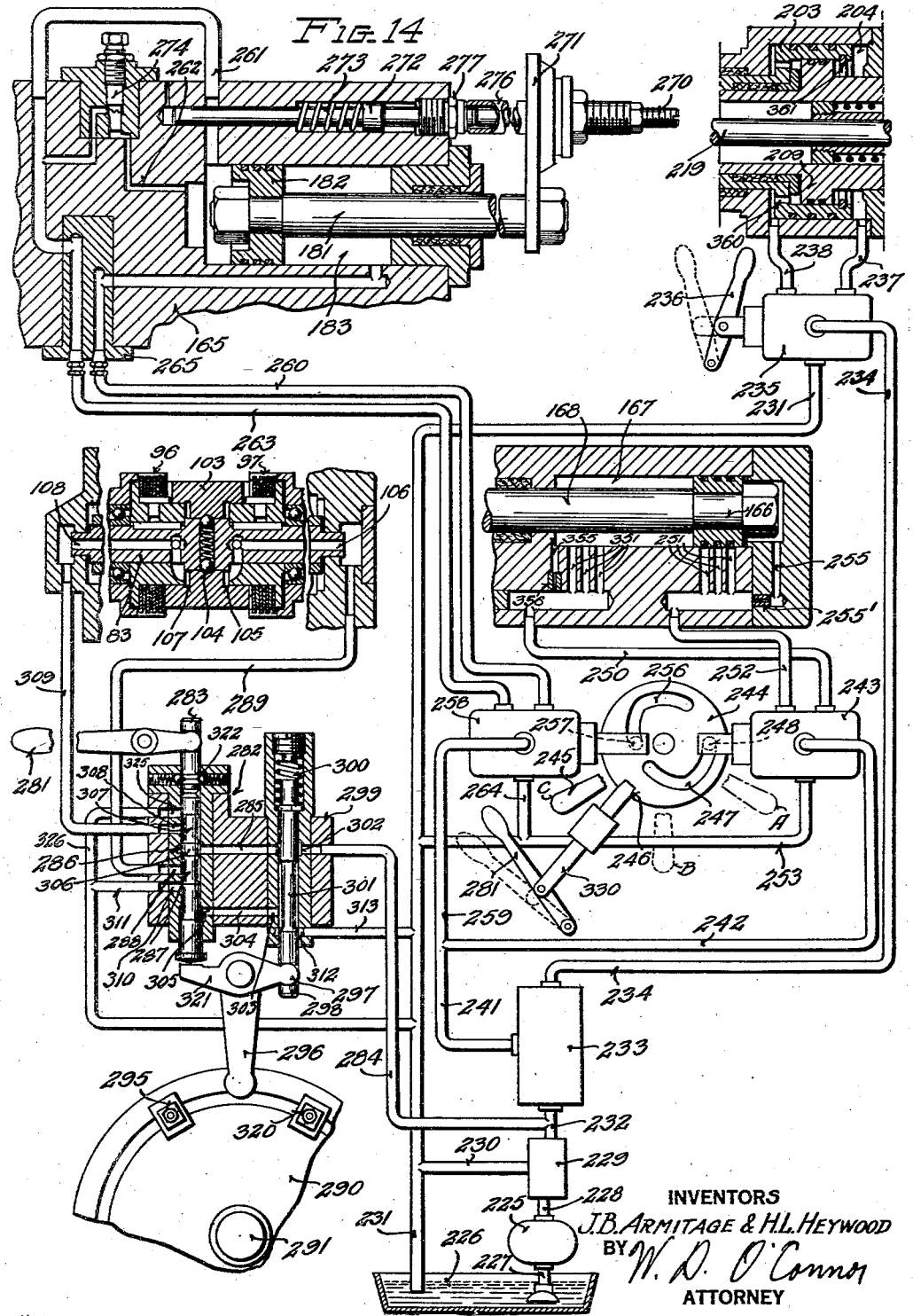

Patented Jan. 7, 1941

2,227,620

UNITED STATES PATENT OFFICE 2,227,620

MILLING MACHINE

Joseph B. Armitage, Wauwatosa, and Harold L. Heywood, West Allis, Wis., assignors to Kearney & Trecker Corporation, West Allis, Wis., a corporation of Wisconsin Application December 14, 1936, Serial No. 115,650

12 Claims. (Cl. 90—59)

This invention relates generally to milling machines and more particularly to improved actuating and controlling mechanism for a machine especially adapted to mill surfaces in positions difficult of access.

A general object of the invention is to provide a milling machine that is capable of performing milling operations in restricted spaces and that is adjustable to effect either curved or linear cutting strokes or a combination of both.

Another object of the invention is to provide a milling machine especially suitable for operating on work pieces presenting restricted cavities within which milling operations are to be performed.

Another object is to provide an improved work-clamping fixture for a milling machine.

Another object is to provide a work-clamping fixture having a plurality of work clamps and improved mechanism for positively releasing the work clamps.

Another object is to provide a work holding apparatus having a plurality of clamps equipped with individual clamping and releasing mechanism and having interconnecting means arranged to apply the forces exerted by all of the mechanisms to any one of the clamps to release it.

According to this invention, a milling machine of the type adapted to perform milling operations in close quarters is equipped with improved transmission and control apparatus arranged to facilitate adjustment of the mechanism and to coordinate operation of the movable elements thereof. The transmission apparatus includes mechanism for positioning and for effecting feeding movements of a plurality of milling cutters and mechanism for holding a workpiece and for moving it into cooperating relationship with the cutters. The control apparatus includes interlocking means arranged to prevent relative movement of the workpiece and the cutters in directions which might result in damage to the machine or destruction of the workpiece. The work-holding mechanism is provided with two independent clamps, each actuated by an independent hydraulic piston, the pistons being subjected to equal pressures for clamping a workpiece in two places. A lost motion mechanism is so arranged between the two pistons that should one of the clamps fail to release on the unclamping stroke, the force exerted by both pistons is applied to release the resisting clamp. The work-holding clamps have swivelling connections with their actuating pistons in manner to permit indexing of the clamped workpiece about its clamping axis, and the entire work-holding apparatus may be pivoted about a vertical axis to facilitate loading.

The foregoing and other objects of this invention, which will become more fully apparent from the following detailed description of a preferred embodiment thereof, may be achieved by the particular apparatus herein described by way of example in connection with the illustrations of its structural components in the accompanying drawings, in which:

Figure 1 is a view in front elevation of a milling machine embodying the novel features of the invention;

Fig. 2 is a top plan view of the milling machine shown in Fig. 1, the tool-carrying slides having been removed to show the top of the main frame;

Fig. 3 is a view in rear elevation of the milling machine shown in Figs. 1 and 2;

Fig. 4 is a view of part of the machine showing the left one of the tool-carrying elements partly in front elevation and partly in vertical section taken substantially along the plane represented by the line 4—4 in Fig. 2;

Fig. 5 is a view in vertical section of part of the tool-carrying structure taken along the plane represented by the line 5—5 in Fig. 2;

Fig. 6 is a view of the left spindle-supporting element taken in the direction of the arrow 6 in Fig. 4, parts having been broken away to show internal mechanism;

Fig. 7 is a view looking in the same direction as in Fig. 6 but taken in section substantially along the plane represented by the line 7—7 in Fig. 4, part of the tool-carrying apparatus having been removed;

Fig. 8 is a view similar to Fig. 7 but taken substantially along the plane represented by the line 8—8 in Fig. 4;

Fig. 9 is a view of the tool-supporting and driving mechanism partly in elevation and partly in section taken substantially along the plane represented by the line 9—9 in Fig. 4;

Fig. 10 is a detail view in section taken along the plane represented by the line 10—10 in Fig. 9, showing the adjusting mechanism for the pivotally mounted tool-driving motor;

Fig. 12 is a view in vertical section of the work-holding fixture and indexing apparatus taken substantially along the plane represented by the line 12—12 in Fig. 2;

Fig. 13 is a horizontal sectional detail view of the work-indexing apparatus taken along the plane represented by the line 13—13 in Fig. 1;

Fig. 14 is a diagrammatic view of the hydraulic transmission and control circuits for effecting coordinated operation of the various movable parts of the milling machine;

Figure 11:
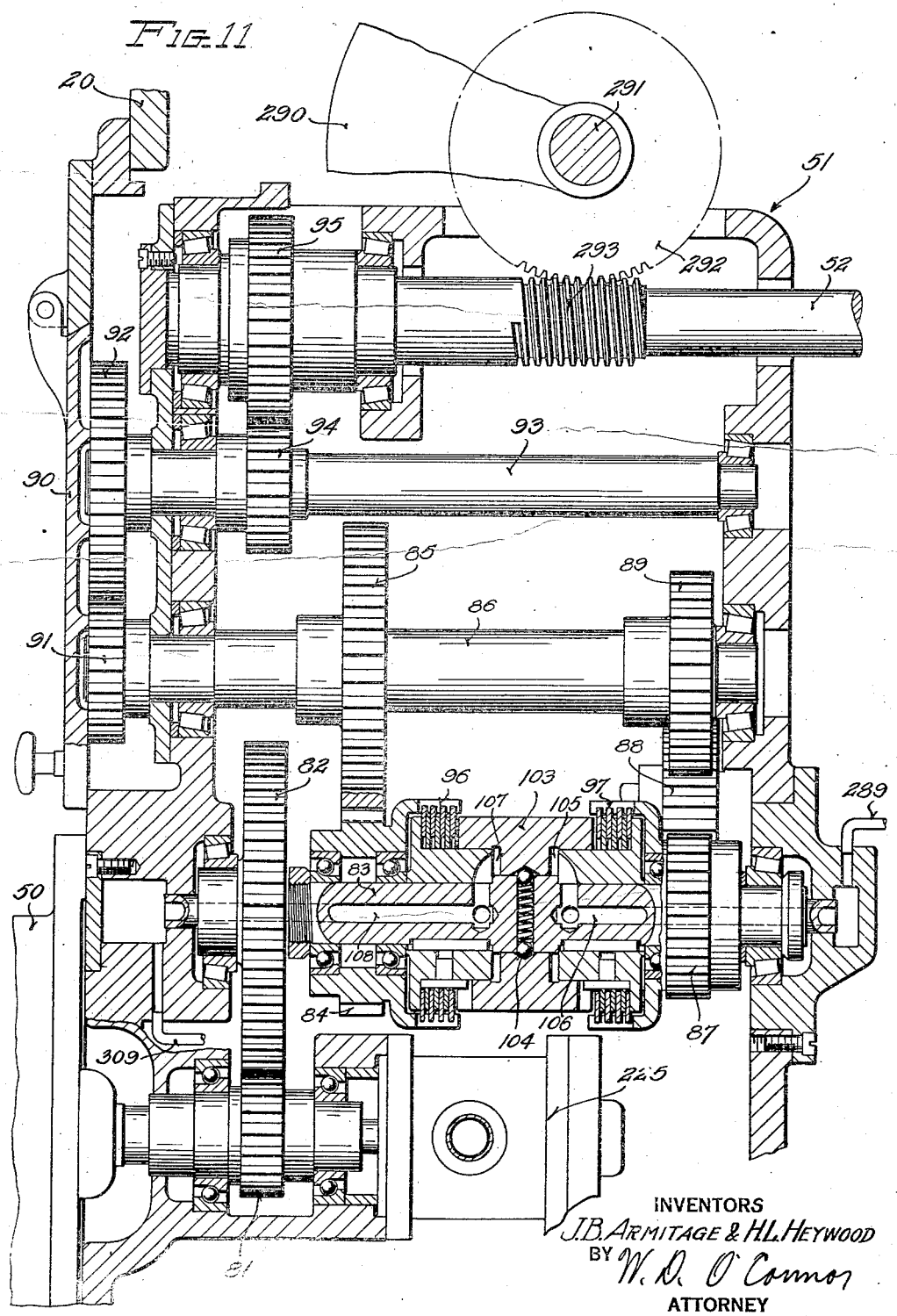
Fig. 11 is an expanded view of the feed rate changing and reversing mechanism for moving the cutter supporting spindles through a cutting stroke.

Fig. 15 (sheet 2) is a detail view of an element of the control mechanism taken along the plane represented by the line 15—15 in Fig. 2; and Fig. 16 (sheet 2) is a sectional view of the control element taken along the line 16—16 in Fig. 15.

The particular machine illustrated in the drawings as constituting apparatus disclosing a preferred embodiment of the several features of this invention is a milling machine especially adapted for milling arcuate ball raceways, such as are required in a universal joint of the type shown in Patent No. 1,522,351 to Carl W. Weiss, although the machine is also applicable to other uses.

Referring more specifically to the drawings, and particularly to Figures 1, 2 and 3 thereof, the illustrated milling machine comprises in general a main frame or bed 20 having at each side an inwardly inclined way, for slidably receiving cutter supporting and driving mechanisms or heads 21 and 22 respectively disposed to cooperate with a work-supporting element 23 mounted on the front of the base 20 and vertically movable relative thereto.

As may best be seen in Fig. 3, each of the cutter carrying heads or units includes a driving motor 26 operatively connected to drive a tool spindle 27 which carries at its upper end an end milling cutter 28 in position to operate upon a workpiece 30 held by the work-supporting element 23. As the surfaces to be machined on the workpiece 30 are disposed within cavities difficult of access and are of non-linear contour, it is necessary that the cutter-supporting apparatus be made adjustable to present each of the cutters to the work at a suitable angle and to move the cutters along predetermined paths to form the desired contoured surfaces. To this end, the cutter-supporting spindles 27 are of tapered construction to permit of operation in close proximity to each other, and each driving motor 26 and its associated spindle 27 is mounted in a unitary frame that is so supported as to be adjustable in several directions.

As may be seen in Figs. 4, 6 and 9, the frame of each driving motor 26 is suspended from a pivotal supporting pin 32 in such manner that it may be swung with its associated spindle 27 through an arc to change the angle of presentation of the cutter 28, as is indicated in Fig. 9 by the dotted outline showing the motor frame in its extreme upper position. The pivot pin 32 carrying the frame of the cutter driving motor 26 and the cutter spindle 27, is supported by a bracket or cradle 33 that is slidably mounted for movement forward or backward relative to the machine base upon a cutter-carrying slide 34, as best shown in Fig. 9. The slide 34 is mounted for movement towards or from the middle of the machine, as shown in Fig. 4, upon a pivotally mounted oscillating sector or rotary base 35. The sector 35 is rotatably supported by a pivot pin 36, shown in Figs. 6, 7, 8 and 9, upon a main slide or sliding base 37 that slidably engages the inclined way of the frame 20, as may be seen in Fig. 4.

Movement of the cutters 28 to mill a surface of arcuate contour is accomplished by turning the sector 35 about its pivot pin 36, as seen in Figs. 7 and 8, and the position and degree of curvature of the arcuate surface is determined by the positions assumed by the various adjusting slides. For cutting a lineal surface, the segment 35 is held stationary and the cutter-supporting bracket 33 is moved in a direction from back to front of the machine upon the slide 34. Chips resulting from the cutting operation, and coolant applied to the cutters, fall down between the cutter heads 21 and 22 into a chip basin or trough 41, Fig. 2, formed in the main frame 20, the coolant draining through a screened opening 42 into a coolant reservoir formed within the frame 20. The accumulated chips may be removed at intervals through an opening 43 provided for that purpose in the back wall of the machine, as shown in Fig. 3.

The power driving mechanism for moving the cutter supporting head through a cutting stroke comprises essentially a driving motor 50, shown in Figs. 1, 3 and 4, that is mounted on the left side of the frame 20 and is directly connected to drive a feed rate changing and reversing mechanism 51 from which a main driving shaft 52, Fig. 4, transmits power in the desired direction and at the desired rate for moving both the cutter head 21 and the cutter head 22 simultaneously. As shown in Fig. 4, the main driving shaft 52 is connected by bevel gearing 53 to a branch drive shaft 54 associated with the left cutter head 21, and by bevel gearing 55 to a branch drive shaft 56 that is associated with the right cutter head 22. As the driving mechanisms for each of the cutter heads are similar except for being oppositely arranged, the mechanism for the left cutter head 21 only is shown in detail as illustrative of the structure.

As shown in Fig. 4, the branch driving shaft 54 of the left cutter head 21 extends into a gear box 57 at the outer side of the frame 20 and has splined connection therein with a sliding gear couplet 58. With the gear couplet 58 in its lower position as shown, power is transmitted to a gear wheel 59 meshing therewith and mounted on a cutter oscillating drive shaft 60 that is operatively connected to rotate the supporting sector 35 about its pivot pin 36. As shown in Fig. 7, the shaft 60 is journalled in the main slide 37 and is provided at its inner end with a bevel pinion 61 that meshes with a bevel pinion 62 connected to a worm 63 also journalled in the slide 37. The worm 63 meshes with worm wheel teeth 64 on the periphery of the sector 35, the arrangement being such that when the worm 63 is rotated by the shaft 60 and the connecting bevel gearing, the sector 35 will be pivoted about the pivot pin 36 in manner to move the milling cutter 28 through an arcuate path.

In order that the sector 35 may be turned manually in adjusting the mechanism, the outer end of the shaft 60 is provided with a squared portion 65 for receiving a hand crank. For adjusting the position of the center of the arcuate movement of the cutter 28 relative to the workpiece 30, the main slide 37 may be moved along the ways on the frame 20 by means of a threaded shaft 66 which is journalled in the frame, as shown in Figs. 2 and 5, and that has threaded engagement with a nut 67 formed on and depending from the slide 37, a squared end portion 68 being provided on the shaft 66 for receiving an adjusting crank. The shaft 60 has splined connection with the gear 59 in the gear box 57 to permit of sliding movement therebetween when the main slide 37 is moved relative to the frame 20, and clamping bolts 69 are provided for clamping the main slide to the frame in the adjusted position.

When it is desired to move the milling cutter 28 in manner to effect a linear cutting stroke, the gear couplet 58 on the driving shaft 54 is moved to its upper position at the outer end of the shaft by means of a shifting lever 70 (Fig. 3) in manner to mesh with a gear couplet 71 journalled in the gear box 57 concentric with the shaft 60 and which has meshing engagement with a gear wheel 72 mounted on a shaft 73 journalled in the upper part of the gear box. As shown in Fig. 8, the shaft 73 is connected by a flexible drive 74, including two universal joints and an intermediate telescoping shaft, to a short shaft 75 that is journalled in a bracket carried by the slide 34 which is mounted on the sector 35. The shaft 75 is provided at its inner end with a bevel pinion 76 that meshes with a bevel pinion 77 on the end of a threaded feed shaft 78 (Fig. 9) that is journalled in the slide 34 and that engages a nut 79 depending from the cutter supporting cradle 33, whereby the cradle and the cutter driving motor 26 carried thereby may be moved transversely of the slide 34.

The feed rate changing and reversing mechanism 51 for regulating the rate and direction of movement of the milling cutter 28 in its feeding stroke is shown in detail in the expanded view, Fig. 11. As there shown, the driving motor 50 is connected to a driving pinion 81 that meshes with a gear wheeel 82 on a main or clutch shaft 83. The main shaft 83 carries a reversing mechanism including a gear wheel 84 mounted on anti-friction bearings and that meshes with a gear wheel 85 on a shaft 86 to constitute a forward feed driving train, and the shaft 83 also carries a rotatably mounted gear wheeel 87 meshing with an idler pinion 88 that in turn meshes with a gear wheel 89 on the shaft 86 to constitute a reverse driving train for driving the shaft 86 in the opposite direction. Shaft 86 extends into a feed rate change gear compartment accessible by opening a door 90. The feed changing gearing consists of a pick-off gear 91 removably mounted on the end of the shaft 86 and a complementary pick-off gear 92 mounted on the end of a jack shaft 93. The pick-off gears 91 and 92 may be of any selected ratio to transmit power at the desired rate from the shaft 86 to the shaft 93, there being a pinion 94 on the shaft 93 which engages a gear wheel 95 on the main driving shaft 52.

To provide for selecting the direction in which the cutter 28 is moved and for reversing the movement of the cutter at the end of a cutting stroke, the gear wheels 84 and 87 rotatably mounted on the main shaft 83 are arranged to be selectively connected to the shaft 83 by friction clutches 96 and 97 respectively. The friction clutches 96 and 97 are arranged to be engaged alternatively, to operate the cutter driving mechanism in the one or the other direction, by means of a fluid pressure actuated device including a piston element 103 that is slidably mounted on the shaft 83 between the clutches and arranged to be normally urged to a central position therebetween by means of a detent mechanism 104. To engage the clutch 96 for driving the mechanism in forward feed direction, fluid pressure is admitted to a chamber 105 at the right end of the piston 103 through a passageway 106 that extends longitudinally of the shaft 83 to the right end thereof, the fluid pressure serving to move the piston 103 to the left, as seen in Fig. 11, and to force the plates of the clutch 96 into engagement. To engage the clutch 97 for driving the mechanism in reverse direction, fluid pressure is admitted to a chamber 107 at the left side of the piston 103 through a passageway 108 extending longitudinally of the shaft 83 to the left end thereof. By reason of the fact that the piston 103 acts directly on the plates of the clutches 96 and 97 under the influence of the fluid pressure, the apparatus is self-adjusting to compensate for any wear to which the clutch plates may be subjected. When pressure is relieved from both the chamber 105 and the chamber 107, the detent mechanism 104 returns the piston 103 to the central position, in which position both of the clutches are disengaged.

The driving mechanism for rotating the cutter supporting spindle 27 comprises a worm 120 secured on the shaft of the motor 26 and that meshes with a worm wheel 121 fixed with the spindle 27, as shown in Figs. 4 and 9. The worm wheel 121 is provided with a relatively long sleeve 122 encircling the spindle 27 and constituting a re-inforcing member for stiffening the spindle. As shown in Fig. 9, the spindle 27 is rotatably supported within a tapered housing 123 that is attached to and constitutes part of the frame supporting the motor 26 and moves therewith as a unit in pivoting about the pivotal supporting pin 32.

In order that the two spindles of the milling machine may operate close together in performing certain milling operations, the housing 123 of each spindle is made in a shape tapering toward the cutter supporting end of the spindle. As near as possible to the cutter receiving end of each spindle, there is provided an anti-friction bearing 124 comprising an outer race 125 mounted in the tapered end of the housing and an inner race 126 formed integrally with the spindle, together with cooperating anti-friction rollers 127 disposed between the outer and the inner races. By forming the inner race 126 integrally with the spindle, the diameter of the bearing 124 is reduced to the minimum and it is possible to place it nearer to the cutter-receiving end of the spindle than would be the case if the inner race were formed separately and fitted over the spindle. The spindle 27 is supported at its other end by an anti-friction bearing 128 carried in a cap 129 fitted in the other end of the housing 123. The cutter receiving end of the spindle is of tapered external contour and is provided with a tapered shield 130 protecting the bearing and with a cylindrical cutting shank receiving socket 131 for receiving the cutter 28. The shank of the cutter 28 is provided with a flat side 132 that engages a driving key 133 in the spindle to prevent rotation of the cutter relative to the spindle. Two set screws 134 and 135 are provided in the spindle for engaging the flat surface 132 of the cutter shank to retain the cutter in the socket 131 at any desired position longitudinally thereof.

To provide for positioning the cutter 28 longitudinally relative to the spindle 27 in effecting adjustment of the mechanism for performing a predetermined milling operation or to compensate for change in the length of the cutter resulting from sharpening it, there is provided a positioning rod 137, extending longitudinally through a central bore of the spindle 27 and arranged to engage with its forward end the inner end of the cutter shank. The rod 137 has threaded engagement with the other end of the spindle in such manner that rotation of the rod relative to the spindle results in adjusting the cutter 28 longitudinally of the spindle. For indicating the amount of movement of the cutter relative to the spindle, the adjusting rod 137 is provided at its outer end with a cylindrical indicating dial 138 having graduations disposed to cooperate with an indicating pointer 139 on a cylindrical member 140 in such manner that the cutter may be moved either inwardly or outwardly by a predetermined increment. The cylindrical member 140 is mounted to rotate with the spindle 27 and constitutes also an adjusting nut for adjusting the spindle bearings. After the cutter 28 has been adjusted, it may be locked in position by tightening the set screws 134 and 135 and the positioning rod 137 may be locked in position by means of a locking mechanism 141 in the exposed end thereof.

For positioning the cutter 28 angularly to adapt it for engaging a workpiece, the cutter driving unit may be pivoted about the pivotal supporting pin 32 by means of a pinion 145 that is disposed to mesh with a gear segment 146 formed on the lower edge of the frame or housing supporting the motor 26 and the spindle 27. As shown in Fig. 10, the pinion 145 is carried on one end of a shaft 147 that is journalled in the supporting cradle 33 and is provided with a squared end 148 for receiving an adjusting crank. After the cutter spindle has been adjusted to the desired inclination, it may be clamped in position by tightening bolts 149 to clamp the frame to the pivot pin 32 and by tightening bolts which engage in an arcuate T slot 150 at the back of the motor frame. Further adjustment of the position of the cutter 28 relative to the workpiece or to the center of the pivot pin 36 may be accomplished by moving the supporting bracket 33 relative to the slide 34 by means of an adjusting crank applied to a squared end 151 of the threaded shaft 78 shown in Fig. 9, and the slide 34 may be adjusted in a direction at right angles to the shaft 78 by means of a threaded shaft 152 shown in Fig. 4, that is journalled in a bracket carried by the slide 34 and has threaded engagement with a nut 153 mounted on the pivoted sector 35, the shaft 152 having a squared end 154 for receiving an adjusting crank. Clamping bolts 156 are provided for clamping the bracket 33 to the slide 34, and other clamping bolts 157 clamp the slide 34 to the arcuate sector 35. To machine an arcuate contour on a workpiece, the cutter 28 is set at a proper angle to engage the work and at the proper distance from the pivot axis of the sector 35 by the various adjustments just explained, and the pivotal axis is adjusted relative to the workpiece by moving the main slide 37 as previously explained.

The work supporting fixture 23 is mounted at the front of the machine, as shown in Fig. 1, and may be adjusted vertically relative thereto by means of a screw and nut elevating mechanism 160 to position the workpiece 30 in proper relation to the pivotal axes of the cutter heads 21 and 22 to effect the desired machining operation.

As best shown in Figs. 1 and 12, the work supporting element 23 comprises a knee portion 163 that is slidably mounted in vertical ways 164 on the front of the main frame 20, and that may be clamped rigidly thereto in the usual manner in the position to which it is adjusted by the elevating mechanism 160. Pivotally mounted upon the knee 163 for movement about a vertical axis is a work-supporting head or saddle 165 that is arranged to be turned from the operating position shown in Fig. 2 through ninety degrees in counter-clockwise direction to a loading position. Pivotal movement of the head 165 is effected by means of a piston 166, shown in Figs. 12 and 14, that operates in a cylinder 167 mounted on the knee 163. The piston 166 is attached to a piston rod 168 provided with rack teeth 169 that mesh with a pinion 170 secured to a depending hub portion 171 of the head 165 that is journalled in the knee 163 by an anti-friction bearing 172. Movement of the pivoting head 165 to the operating position is limited by a positive stop 175 (Fig. 1) on the knee which engages the head and accurately positions it to support the workpiece in alignment with the cutters. Another similar positive stop 176 is provided at the other side of the knee for stopping the head in the loading position. After the head has been pivoted to the operating position, it may be rigidly clamped by means of a circular clamp 177 that engages a gib 178 and that is actuated by a clamping lever 179 at the left side of the knee.

The pivotally mounted head 165 supports a work-holding fixture 180 that is slidably mounted thereon for linear movement toward or from the cutters. As shown in Fig. 12, the fixture 180 has connected to it a piston rod 181 carrying a piston 182 that operates within a cylinder 183 formed in the rotatable head 165. Sliding movement of the fixture 180 is effected by admitting fluid under pressure to the cylinder 183 at one or the other side of the piston 182.

The forward nose portion of the fixture 180 is arranged to rotatably support a work holder 185 that may be turned about a horizontal axis to position the workpiece for successive cutting operations. As shown in Fig. 12, the work holder 185 is in the form of a sleeve journalled in the fixture 180 and is provided with an encircling bevel ring-gear 186 that meshes with a bevel pinion 187 (Fig. 13) carried on an indexing shaft 188 that is journalled in the fixture 180 at right angles to the sleeve and is provided at its outer end with an indexing crank 189, the gear ratio being such that four turns of the crank 189 result in one complete revolution of the work holder 185.

The work holder 185 is provided with two separate clamps for engaging the workpiece 30 at spaced positions, each clamp being independently operated in such manner that they exert substantially equal clamping pressures. As shown in Fig. 12, the work clamp comprises a forward split collet 192 that is supported within the forward end of the work holder 185 against a retaining ring 193 in position to engage a cylindrical portion at the forward end of the workpiece. The second clamp comprises a similar split collet 194 disposed co-axially with and inwardly from the collet 192 in position to engage another cylindrical portion at the inner end of the workpiece. Although the workpiece is shown as presenting cylindrical surfaces for engagement by the collets 192 and 194, it will be understood that collets of other than cylindrical shape and of other sizes, or any other suitable clamping means may be substituted for gripping a workpiece of different shape. The two collets 192 and 194 are arranged in abutting relationship and the inner collet is engaged by a retaining ring 195 that is supported from the work-holding sleeve 185 by means of pins 196 in such manner as to hold the collets against each other and against the retaining ring 193 to prevent endwise movement thereof As shown, both of the collets 192 and 194 are provided with tapered external surfaces for engagement by complementary actuating sleeves 198 and 199 respectively, the sleeve 199 being positioned within the sleeve 198. The sleeves 198 and 199 are also split longitudinally to provide for circumferential resilience and they are so arranged that upon movement toward the forward end of the work holder, they co-act with the tapered surfaces of the cooperating split collets 192 and 194 to cause them to contract and grip the workpiece. The outer actuating sleeve 198 is arranged to be operated by a cylindrical sleeve 201 which is operatively connected to it by an anti-friction thrust bearing 202 constituting a swivelling connection permitting the sleeve 198 to turn with the work holder 185 during indexing operations while the sleeve 201 remains stationary within the body of the mixture 180. For moving the sleeve 201 longitudinally to effect clamping action of the collet 192, there is provided a piston 203 which is attached to the end of the sleeve in position to operate within a cylinder 204 attached to the back of the fixture 180 in co-axial relationship with the clamping collets. For moving the inner actuating sleeve 199 there is provided a cylindrical sleeve 207 arranged to operate within the sleeve 201 and having swivelling connection with the actuating sleeve 199 by means of an anti-friction thrust bearing 208. The sleeve 207 is likewise provided with a piston 209 which is arranged to slide within a cylindrical inner surface of the piston 203, the arrangement being such that when the fluid pressure is applied to the back of the pistons in the outer end of the common cylinder 204, both the piston 203 and the piston 209 will be moved forward independently of each other to apply independent self-locking clamping action upon the two portions of the workpiece by the respective collets 192 and 194.

For positioning the workpiece 30 in the work holder, there is provided a positioning fixture or gauge 215 that is pivotally supported on a bar 216 adjustably mounted on the top of the work-holding fixture 180 in such manner that it may be swung down into work-engaging position as shown in Fig. 12, or turned upward to an inactive position as shown in Figs. 1, 2 and 3. When the fixture 215 is in the position shown in Fig. 12, it is adapted to engage the end of a workpiece 30 by means of a plain stop surface 217 extending transversely of the axis of the workpiece and to engage a locating side of the workpiece by means of a transversely adjustable member 218 having a flat positioning surface extending parallel with the axis of the workpiece. The workpiece 30 is urged against the positioning fixture 215 by means of a spring-loaded positioning bar 219 that extends longitudinally through the inner operating sleeve 207 and is urged in forward direction by means of a spring 222. After the workpiece has been positioned in the work holder 185 by the positioning fixture 215, the clamping collets 192 and 194 are contracted to grip the workpiece by admitting fluid pressure to the right end of the cylinder 204 and the positioning fixture is then swung up to its inactive position.

Fluid pressure for actuating the clamping pistons and for operating the other fluid actuated parts of the machine is provided by a pump 225 that its directly connected to the end of the shaft of the driving motor 50, as shown in Figs. 4 and 11, for operation thereby to withdraw liquid from a sump 226 in the bottom of the main frame 20 by means of a suction pipe 227. Referring to the circuit diagram in Fig. 14, liquid under pressure from the pump 225 passes through a conduit 228 into a pressure relief valve 229, which serves to limit the pressure in the conduit to a predetermined maximum and to permit any excess liquid to flow through a conduit 230 into a return conduit 231 which leads back to the sump 226. From the relief valve 229, the pressure liquid passes through a conduit 232 into a by-pass valve 233, from which it flows through a conduit 234 to a work-clamping valve 235. To clamp the workpiece, a clamping lever 236 on the valve 235 is moved from the position shown in dotted lines to the solid line position, thereby admitting fluid from the valve 235 through the conduit 237 into the right end of the cylinder 204 to exert clamping pressure upon both the piston 203 and the piston 209 to move them forward and contract the collets 192 and 194. Fluid in the forward end of the cylinder 204 flows outward through a conduit 238 into the valve 235 and thence into the return conduit 231.

After the workpiece has been clamped in the work holder, the pivotally mounted supporting head is turned in clockwise direction to operating position. For this purpose, liquid under pressure flows from the by-pass valve 233, which functions to permit the liquid to pass into a conduit 241 from which a branch line 242 leads to a control valve 243, the arrangement being such that should the pressure in the system drop below a predetermined minimum, the by-pass valve 233 will close the conduit 241 to conserve the remaining liquid pressure for acting on the work clamping mechanism. The valve 243 controls the swinging or pivoting movement of the work-holding head 165 and it is actuated by a cam plate 244 which may be turned by an operating lever 245, shown in Fig. 15, to any one of three positions, a detent mechanism 246, Fig. 16, being provided to retain the cam in the selected position. The cam plate 244 is provided with a cam groove 247 that engages a cam follower 248 on the operating stem of the valve 243. The shape of the cam groove 247 is such that when the operating lever 245 is moved from the position A, shown in dotted lines, to the dotted line position B, the valve 243 will be positioned to admit pressure fluid through a conduit 250 to the inner or left end of the cylinder 167, thereby forcing the piston 166 to the right and turning the work-supporting head 165 clockwise from the loading position to the operating position. Fluid in the outer or right end of the cylinder 167 escapes through a series of exhaust openings 251 into an exhaust passageway 252 and thence through the valve 243 to a conduit 253 that connects to the return conduit 231. As the pivoting head 165 approaches the working position and the piston 166 approaches the right end of the cylinder 167, the exhaust passageways 251 are successively closed by the piston as shown in Fig. 14, thereby reducing the rate of flow of the liquid and checking the movement of the swinging head. After the last one of the exhaust openings 251 is closed by the piston 166, the remaining fluid in the end of the cylinder 167 escapes through an auxiliary passageway 255 having a constricted portion 255' of such limited capacity that the final movement of the work-supporting head into working position occurs very slowly in order that the head may engage the positive positioning stop 175 without shock. After the work-supporting head 165 has been turned to working position, it is clamped by actuating the clamping lever 179 to engage the circular clamp 177 with the gib 178 on the hub 171 of the head, thereby drawing the head down tightly upon the top of the knee 163.

To advance the workpiece to the cutters, the operating lever 245 may then be moved from position B to position C, the shape of the cam groove 247 being such that no change occurs in the position of the valve 243. In moving the lever from position B to position C, a second cam groove 256 in the cam plate 244 acts upon a cam follower 257 on the stem of a control valve 258 in manner to position the valve for admitting pressure fluid, flowing to it from the conduit 241 through a branch conduit 259, into a conduit 260 that leads to the right end of the cylinder 183 to move the work-holding fixture 180 forward toward the cutters. As the fluid is admitted into the right end of the cylinder 183, it forces the piston 182 to the left and the fluid in the left end of the cylinder escapes through a rapid traverse rate passageway 261 and a feed rate passageway 262, both of which lead to an exhaust conduit 263 through which the exhaust fluid returns to the valve 258 and thence through a conduit 264 to the conduit 253 and the return conduit 231 leading to the sump 226. Both the pressure conduit 260 and the exhaust conduit 263 pass through a cylindrical piston 265 that is mounted in the center of the hub 171 and that constitutes a rotatable connection with the swinging head 165.

The arrangement is such that the fluid pressure acting on the right end of the piston 182 causes the workpiece 30 to advance toward the cutters 28 at rapid traverse rate. As the workpiece approaches the cutters, an adjustable actuating rod 270 carried by a bracket 271 that is mounted on the piston rod 181, moves into contact with a cut-off valve 272, which is slidably mounted in the fixture in cooperating relationship with the rapid traverse passageway 261, and is held in retracted position by a spring 273, the rod moving the valve forward to close off the passageway, as shown in Fig. 14. After the passageway 261 is closed, all of the escaping exhaust fluid from the cylinder 183 must pass through the feed rate passageway 262 which is provided with an adjustable throttle valve 274 by means of which the rate of flow of the exhaust fluid may be regulated in order that the workpiece 30 may be fed against the cutters at a predetermined rate to permit the cutters to feed into the cavities of the workpiece along a linear path. To position the cutters accurately within the workpiece at the point from which the arcuate cutting stroke is to start, the bracket 271 on the piston rod 181 is provided with an adjustable positive stop sleeve 276 which is disposed concentric with the rod 270 and may be set to abut a stop member 277 on the head 165 when the workpiece arrives at the predetermined position.

After the forward feeding movement of the work-holding fixture 180 has been completed, the fixture is clamped to the head 165 by actuating a clamping lever 278 (Fig. 1) to support the workpiece rigidly in position for the feeding or cutting stroke of the cutters 28.

To initiate the cutting stroke, a starting lever 281 associated with a direction-controlling valve 282, as shown in Fig. 14, is actuated to move a plunger 283 of the valve to its upper position. With the valve plunger 283 in its upper position, pressure fluid from the pump 225 is permitted to flow by way of the conduit 228, relief valve 229 and conduit 232, through a conduit 284 and a passageway 285 in the body of the valve 282 to a port 286 and thence through a groove 287 in the valve plunger 283 to a port 288, which is connected by a conduit 289 to the passageway 106 in the right end of the driving shaft 83. As previously explained, when pressure fluid is admitted to the passageway 106, it flows into the chamber 105 and forces the piston 103 to the left, thereby engaging the forward driving friction clutch 96 to cause the transmission mechanism 51 to swing the cutting heads 21 and 22 in the forward cutter feeding direction.

During the forward cutting stroke, the cutters 28 each take a roughing cut on the workpiece 30 along an arcuate path. As the cutting stroke progresses, a control drum 290, mounted at the rear of the machine, as shown in Fig. 3, is rotated in clockwise direction, as seen in Fig. 14, by a shaft 291 that is driven by a worm wheel 292 meshing with a worm 293 on the main driving shaft 52 as shown in Fig. 11. At the end of the cutting stroke, a reversing trip dog 295 on the drum 290 engages a pivotally mounted trip lever 296 having an arm 297 that engages a plunger 298 of a reversing pilot valve 299, the arrangement being such that when the trip dog 295 moves the trip lever 296 to the right, the plunger 298 is moved upwardly against the resistance of a spring 300 to a position in which a groove 301 on the plunger communicates with a port 302 in the valve body which is connected with the pressure fluid passageway 285. Pressure fluid from the port 302 then flows along the groove 301 to a port 303 connected by a passageway 304 to a chamber 305 encircling the directional valve plunger 283. Pressure in the chamber 305 forces the valve plunger 283 downward below the position in which it is shown in Fig. 14, thereby moving a land 306 of the plunger 283 past the port 286 to cut off the flow of pressure fluid to the port 288 and to permit flow thereof through a groove 307 to a port 308 which is connected by a conduit 309 to the passageway 108 in the left end of the shaft 83. Fluid under pressure from the conduit 309 passes through the passageway 108 into the chamber 107 and forces the piston 103 to the right, thereby disengaging the forward feed driving clutch 96 and engaging the reverse driving clutch 97, the fluid in the chamber 105 being forced out through the passageway 106, the conduit 289 and valve port 288, to the groove 287 which now connects with an exhaust port 310 communicating with an exhaust conduit 311 which is connected to the return conduit 231. Upon engagement of the reverse clutch 97, the cutters 28 are moved in reverse feed back along their arcuate paths to take a finishing cut on the workpiece.

As soon as the control drum 290 has progressed in the reverse direction a sufficient distance to disengage the reversing dog 295 from the pivoted lever 296, the lever is returned to the neutral position shown in Fig. 14 by the action of the spring 300 which moves the pilot valve plunger 298 downward, closing the pressure fluid port 302 and opening an exhaust port 312 to permit liquid from the chamber 305 to escape through the passageway 304, the port 303, the groove 301, port 312, and a conduit 313 which connects with the return conduit 231, thereby releasing the directional valve plunger 283 for movement manually by the lever 281 should it be desired to stop the feeding movement. As the cutters 28 return through the finishing cut to their starting positions, the control drum 290 is turned in counter-clockwise direction, moving a stop dog 320 into engagement with the trip lever 296. When the stop dog 320 engages the trip lever and moves it to the left, an arm 321 of the lever engages the lower end of the directional valve plunger 283 and moves it upward to the neutral position shown in Fig. 14, a detent mechanism 322 being provided for retaining the valve plunger in either its central neutral position or its upper forward cutter feed driving position. As may be seen in Fig. 3, the stop dog 320 is provided with an adjusting screw 323 for accurately and rigidly positioning it.

When the valve plunger 283 is in the neutral position, the pressure port 286 is closed by the land 306, thereby cutting off the supply of pressure fluid to the reversing clutch mechanism, and the groove 287 communicates with the exhaust port 310 to permit exhaust liquid from the chamber 105 of the reversing mechanism to flow through the passageway 106, the conduit 289, and port 288, into the exhaust conduit 311. Also the groove 307 communicates with an exhaust port 325 to permit exhaust fluid from the chamber 107 to flow through the passageway 108, the conduit 309, and port 308, through the port 325 into an exhaust conduit 326 which connects with the exhaust conduit 311. This results in relieving pressure from both sides of the clutch actuating piston 103 and in permitting the piston to move to its central neutral position under the influence of the detent mechanism 104, thereby stopping the feeding movement of the cutter carrying heads.

After the finishing cut movement of the cutters has been terminated, the workpiece may be withdrawn from the cutters for the purpose of indexing it to a new position for a second cut. To insure that the workpiece will not be moved while the cutters are moving through the cutting stroke, a mechanical interlocking arrangement is provided, as shown diagrammatically in Fig. 14, and in detail in Figs. 15 and 16. To this end, the feed starting lever 281 is pivotally connected by a link 330 to an interlocking plunger or control bar 331 that is associated with the control lever 245, the arrangement being such that when the feeding lever 281 is in the neutral position, the control lever 245 may be moved to any of its three positions. As shown in Fig. 16, the interlocking plunger 331 is provided with a notch 332 which is positioned to permit a lug 333 on the lever 245 to pass through it in turning the cam plate 244 from one position to another, the control bar 331 preventing movement of the lever 245 when the notch 332 is not in alignment with the lug 333. This interlocking mechanism prevents starting the cutting heads through a cutting stroke when the work-holding fixture is not in operating position inasmuch as under these conditions the lug 333 of the lever 245 then engages the notch 332 and prevents movement of the starting lever 281.

To withdraw the workpiece from the cutters, the work-holding fixture 180 is first unclamped by actuating the clamping lever 278 and then the control lever 245 is moved from position C to position B, thereby admitting fluid under pressure from the pump 225 through the control valve 258 and the conduit 263 to the passage 262 leading to the left end of the cylinder 183, causing the piston 182 to move to the left at feed rate. After the workpiece has been moved at feed rate the distance necessary to clear the cutters 28, the valve plunger 272 is released by the actuating rod 270, and moves outward under the influence of the spring 273, thereby opening the rapid traverse rate passageway 261 which results in the workpiece being retracted the remaining distance at rapid traverse rate. The workpiece 30 may then be indexed to its new position, in this instance by turning it through 180 degrees, to present the other side thereof (as may be seen in Fig. 3) to the cutters. The 180-degree indexing movement is accomplished by turning the indexing crank 189 through two complete revolutions and then re-engaging a spring-pressed pin 335 on the crank in a socket 336 in the body of the fixture 180, as shown in Fig. 13. Turning the crank 189 results in rotating the work-carrying sleeve 185 within the front of the work-holding fixture and with it the clamping collets 192 and 194, together with their actuating sleeves, the rotation of the sleeves being permitted by the swivelling connections afforded by the anti-friction bearings 202 and 208. After the workpiece has been indexed, it is clamped in the new position by actuating a clamping lever 340 after which the work-holding fixture 180 may be moved forward to engage the work with the cutters a second time by moving the control lever 245 from the position B to the position C as previously explained. The fixture is then clamped by means of the lever 278 and the second cutting stroke is started by means of the starting lever 281, the mechanical interlock being so arranged that with the lever 245 at position C, the lug 333 is disengaged from the notch 332.

After the second cut has been completed and the directional valve 283 and its lever 281 have been returned to stop position, the notch 332 is again brought into alignment with the lug 333 to permit movement of the control lever 245. The clamp lever 278 is then operated to unclamp the sliding fixture 180 and the control lever 245 is moved from position C to position B to effect retraction of the workpiece from the cutters, as previously explained. In this operation, the cam disc 244 acts as an interlock to prevent turning movement of the work-holding head 165 while the control lever 245 is in position B to avoid swinging the workpiece sidewise against one of the cutters. After the workpiece has been retracted, the work-supporting head 165 is unclamped by releasing the circular clamp 177 from the gib 178 by means of the clamping lever 179 and the control lever 245 is then moved from position B to position A to position the control valve 243 for admitting pressure fluid through the conduit 252 to the right end of the cylinder 167, thereby forcing the piston 166 to the left and turning the work head counter-clockwise, as seen in Fig. 2, to the unloading position. Liquid in the left end of the cylinder 167 escapes through a series of exhaust openings 351, which are successively closed by the piston to decelerate the movement, the final movement occurring at slow rate by the escape of liquid through an auxiliary exhaust passage 355 having a constricted portion 356.

After the work-supporting head 165 has been pivoted to the unloading position, the work-clamping lever 236 is actuated to unclamp the workpiece 30 by positioning the valve 235 in manner to admit pressure fluid through the conduit 238 to the left end of the cylinder 204. The fluid pressure in the left end of the cylinder urges the piston 203 to the right and also exerts pressure on the piston 209 independently by reason of the fluid passing through passageways 360 in the piston 203 to act upon the face of the piston 209. Movement of the pistons 203 and 209 to the right, as seen in Figs. 12 and 14, withdraws the actuating sleeves 198 and 199 from the tapered outer surfaces of the clamping collets 192 and 194 and permits the collets to expand and release the workpiece 30. The pistons 203 and 209 are interconnected by an interlocking lost motion mechanism in such manner as to permit independent clamping action thereof and to provide for cooperative unclamping action. Should either one of the actuating sleeves 198 or 199 resist the unclamping action of its associated piston, the lost motion of the mechanism is taken up by movement of the other piston, and the force exerted by the pressure fluid upon the full area of both pistons is applied to release the resisting clamp. For instance, should the inner clamping sleeve 199 resist movement, the outer piston 203 would abut against the inner piston 209 to assist in the unclamping action. If the outer clamping sleeve 198 resists, the inner piston 209 in moving to the right engages a retaining ring 361 in the inner surface of the piston 203 and exerts force thereon to assist in the unclamping action. After the collets 192 and 194 have released the workpiece 30, it may be removed from the work-holding fixture. Any chips or coolant liquid that may drop from the finished workpiece at the loading position are caught in a trough 363 which communicates with the main chip-receiving trough at the center of the frame 20. A fresh workpiece is then inserted in the work holder and clamped therein by actuating the clamping lever 236, and the cycle of operations just described is repeated.

Although a specific milling machine has been described in detail in order to clearly disclose the several features of this invention, it is to be understood that the particular apparatus shown and described is susceptible of various modifications that will be apparent to those skilled in the art, without departing from the spirit and scope of the invention as defined in the subjoined claims.

The invention having been fully set forth in the foregoing specification, we claim:

1. In a power operated work clamping apparatus for a machine tool, the combination with a plurality of independently operated work clamps, of independent power operated actuating mechanism for each of said clamps, said mechanisms being selectively operative as a group to exert clamping force or to exert force to positively release said clamps, and lost motion mechanism interconnecting said actuating mechanisms in manner to permit equalized independent clamping action thereof and to provide for cooperative unclamping action, whereby should a clamp resist being released by its power operated actuating mechanism the lost motion of said lost motion mechanism will be taken up by movement of an actuating mechanism of a clamp which has been released and the force of said second actuating mechanism will then be exerted to assist in releasing the resisting clamp.

2. In a power operated work clamping mechanism, the combination with a plurality of independently operating work clamps, of an independent actuating mechanism for each of said clamps, said mechanisms each including a piston, means for applying pressure to the one or the other side of each of said pistons for clamping or unclamping work, and lost motion mechanism interconnecting said pistons in manner to permit limited relative movement therebetween for effecting equalized clamping action, said relative movement being so limited by said mechanism that the lost motion thereof is taken up by the actuating mechanism in its first releasing movement in manner to effect combined action of all of said pistons in exerting force to release any one of said clamps which may fail to release under the force exerted by its operating piston.

3. In a work clamping apparatus for a machine tool, two clamping elements arranged to engage a workpiece at spaced positions, independent mechanisms arranged to operate said clamping elements each of said mechanisms including an actuating piston, and a common hydraulic cylinder disposed to receive both of said pistons, whereby hydraulic pressure applied to said cylinder exerts equalized clamping force through said pistons and the clamping elements actuated thereby upon the workpiece at the two positions engaged by said eelments.

4. In a work clamping mechanism for a machine tool, an arrangement for clamping a cylindrical workpiece at two spaced positions simultaneously in manner to present one end thereof for machining, comprising a frame, a front split collet supported in said frame, a sleeve slidably mounted in said frame concentric with and outside of said split collet and operative upon longitudinal movement to slide over and contract said collet for gripping a workpiece, an actuating cylinder carried by said frame, a piston slidably mounted within said cylinder and operatively connected to said sleeve in manner to effect actuation of said collet, a rear split collet supported by said frame within said outer sleeve, an inner sleeve slidably mounted within said outer sleeve and outside of said rear collet and operative upon longitudinal movement to slide over and contract said rear collet, and an inner piston operatively connected to said inner sleeve and slidably mounted within said outer piston, whereby fluid pressure admitted to said actuating cylinder will cause both of said collets to be contracted with substantially equalized clamping pressure.

5. A work holding fixture comprising two independently operating clamps adapted to be engaged simultaneously for holding work, power actuated means for engaging each of said clamps independently with predetermined clamping pressure said power means being selectively operative to positively release said clamps, and an interlocking mechanism associated with said clamps and operative upon failure of either clamp to release under the force of its power actuated operating means to apply the force of the other power actuated means also to said resisting clamp to assist in its release.

6. In a work holding apparatus for a machine tool, means disposed to engage a workpiece at two spaced positions, an independent operating mechanism connected to each of said means, an independent hydraulic actuating device for each of said operating mechanisms, and a common hydraulic cylinder for receiving said actuating devices, whereby equalized pressure may be exerted by said engaging means at the two positions of engagement thereof with the workpiece.

7. In a work holder for a machine tool, the combination with power actuated clamping means, of a positioning gauge removably disposed to engage and position a workpiece, and a spring urged work engaging means disposed to press the workpiece into engagement with said positioning gauge, whereupon said power actuated clamp may be actuated to grip the workpiece and then said positioning gauge withdrawn to present the workpiece for machining.

8. In a work holder, a work supporting fixture, a work clamping device on said work supporting fixture for clamping a workpiece thereto including two clamping elements arranged to engage the workpiece at spaced positions, two hydraulic actuating pistons connected respectively to actuate said clamping elements independently, and a common hydraulic cylinder disposed to receive both of said pistons and operative to exert equalized clamping force on said clamping elements.

9. In a power operated work clamping apparatus for a machine tool, the combination with a plurality of independently operated self-locking work clamps, of an independent power operated actuating mechanism for moving each of said clamps, said mechanisms being selectively operative as a group to exert force for locking said clamps or to exert force to positively unlock said clamps, and lost motion mechanism interconnecting said actuating mechanisms in such manner as to permit equalized independent clamping action thereof and to provide for cooperative unclamping action, whereby should a clamp resist being unlocked by its power operated actuating mechanism, an actuating mechanism of a clamp which has been unlocked will exert force through said interconnecting lost motion mechanism to assist in unlocking the resisting clamp.

10. In a machine tool, a power operated work clamping mechanism adapted to clamp a workpiece at two positions, the combination with two independently operating clamps, of mechanism for actuating said clamps including a piston associated with each clamp, means for applying equalized pressure to one side of each of said pistons for actuating said clamps in manner to exert substantially equal clamping pressures on said workpiece at two positions, means for applying pressure to the other side of each of said pistons for releasing said clamps, and a lost motion mechanism interconnecting said pistons in such manner that should only one of said clamps release upon application of releasing pressure to said pistons, the lost motion of said mechanism will be taken up in such manner that the force exerted by both pistons will become effective to release the remaining clamp, said lost motion mechanism being so arranged as to permit equalized clamping action by said clamps.

11. In a power operated work clamping apparatus for a machine tool, a plurality of independently operating work clamps, an independent power operated actuating mechanism associated with each of said clamps for exerting force to engage it or to positively disengage it, and interlocking mechanism interconnecting said power actuating mechanisms in manner to permit simultaneous independent clamp engaging action thereof and to provide for cooperative clamp disengaging action thereof, said interlocking mechanism being so arranged that should any clamp resist disengagement by its associated actuating mechanism the actuating mechanism of a disengaged clamp will exert its force through said interlocking mechanism upon said resisting clamp to assist in disengaging it.

12. In a work clamping mechanism for a machine tool, an arrangement for clamping a workpiece at two spaced positions simultaneously in manner to present it for machining, comprising a supporting frame, a front contractable collet rotatably supported in said frame, an outer sleeve slidably mounted in said frame concentric with said collet and operative upon longitudinal movement to contract said collet for clamping a workpiece, an actuating cylinder carried by said frame, an outer piston slidably mounted within said cylinder in axial alignment with said sleeve, a swivel joint operatively connecting said piston to said sleeve for actuating it to contract said front collet, a rear contractable collet rotatably supported within said outer sleeve, an inner sleeve slidably mounted within said outer sleeve and operative upon longitudinal movement to contract said rear collet, an inner piston slidably mounted within said outer piston, and a swivel joint operatively connecting said inner piston to said inner sleeve, the arrangement being such that both said front collet and said rear collet may be rotated for positioning a workpiece without turning said pistons within said cylinder and without interfering with the operative connections between said pistons and said contractable collets whereby said collets are actuated by fluid pressure admitted to said cylinder.

JOSEPH B. ARMITAGE.
HAROLD L. HEYWOOD.

CERTIFICATE OF CORRECTION.

Patent No. 2,227,620.   January 7, 1941.

JOSEPH B. ARMITAGE, ET AL.

It is hereby certified that error appears in the printed specification of the above numbered patent requiring correction as follows: Page 3, first column, line 40, for "wheeel" read --wheel--; and second column, line 63, for the word "cutting" read --cutter--; page 5, first column, line 25, for "mixture" read --fixture--; page 8, second column, line 33, claim 3, for "eelments" read --elements--; line 39, claim 4, for "collect" read --collet--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.